United States Patent
Lupo et al.

(10) Patent No.: US 6,357,002 B1
(45) Date of Patent: Mar. 12, 2002

(54) AUTOMATED EXTRACTION OF BIOS IDENTIFICATION INFORMATION FOR A COMPUTER SYSTEM FROM ANY OF A PLURALITY OF VENDORS

(75) Inventors: Patrick D. Lupo, Sunnyvale; Sajid G. Hussain, Fremont; Gregory D. Collins, Pacifica, all of CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/372,539

(22) Filed: Aug. 11, 1999

(51) Int. Cl.[7] .............................. G06F 7/00; G06F 12/00
(52) U.S. Cl. ............................................................. 713/1
(58) Field of Search ........................... 713/1, 2; 707/1, 707/3, 6

(56) References Cited

U.S. PATENT DOCUMENTS 5,050,071 A * 9/1991 Harris et al. ................... 707/1
5,963,942 A * 10/1999 Igata ............................. 707/6

* cited by examiner

Primary Examiner—Thomas M. Heckler
(74) Attorney, Agent, or Firm—Monica H. Choi (57) ABSTRACT

BIOS (Basic Input/Output System) identification information is automatically extracted from raw BIOS data for a computer system from any of a plurality of vendors. The raw BIOS data is processed using a searching and parsing routine to reformat the raw BIOS data to a BIOS variable such that BIOS identification information is more easily accessible from the BIOS variable. The raw BIOS data is processed within a computer system from any of the plurality of vendors irrespective of the initial format of the raw BIOS data to generate the BIOS variable. In addition, the BIOS variable is searched for predetermined text strings corresponding to the plurality of possible vendors such that the brand name, the model name, the BIOS date, and/or the BIOS version may be determined for a computer system from any of the plurality of vendors. Alternatively, the BIOS variable may be processed using a check sum technique with a look-up table for determining the brand name and/or the model name of the computer system from any of the plurality of vendors.

26 Claims, 6 Drawing Sheets

? è??é  _è_?èU?)_M?  _t_è  4é__øÃ  S?Øœúè_ÇŠàŠÃçä_Šç[ÃS?Øœúè
öÔ"Äëçœúæäå_ÃPé?           éü_é)Cé¨ÿéÁ_èï_Èè´åËèt    Èè
ËèÎšËè_5Ëèþ<Ëè_<Ëèÿ<ËèI4Ëè?4Ë  o^Ëè__ËèÛ[Ëè ÎËè85Ë__Sÿ0_ _4ç?H~â
à?5Ø[Ø_Ø?Ø5Ø_çÈ?Î?!>_>_?$>þFÇæêW_ð?ÚèÛ?èmšé5?èÒ?èEšé??_Q__A__
oïoïÃâoïoïTÿ@áoï?þ?éoïoïoïoïoïoïSÿMøAøYì9çYø.èÒïE_òænþÖïDøoïoï,6À)oïoï_i_@}_
?_À_Ñ_ç_** Bad _RTC battery  _check sum (CMOS) ** _configuration
** _memory size  _HDD type  _time function  _check sum (ROM) *
Check system. Then press [F1] key._ üúE_æaE æaŒÈ_Ð?{_?Ûâþäd"_u_é"_E_æpë äqë
Šà3ÛE_æpë ŠÇæq_Ûät_éE_,? çäf,?_f,x_fï?üf,___fï?øf,t_fï?üf,___fiÛu_ê_ Ðê
Ð?Êf,Œ _?øfï?üì$ÿî?Ñ?ÿÿéÚþê_ Ð?_éâT?_éB?_üt._ü _?¯@_ü_wÃ_?ü?ï_r?_ÿ?þ
éã  .ÿ?ø  3À_Ð?àæaéš  ä`ÿ.g_è%FèÁ´èû|úä?ë
?_ðÿE_èØ¯E0èÓ¯Š&øÿEè??ö_øÿÿu_ä?"_uä_"u?"_tLû?J_.Š=?>øÿt_.?u_è
?_æ_ì¯___F_ÿ_?_æ_F4ì¯___À_ð_?4e_=_v_?_v_?__4_æ_14(_ì_1_v_?_v_?__4
_æ_ì_?Eì_uEì_?Eì_ŸEì_?E?_æ_~___5_æ_ì_/5_æ_ì¯___À_!6_æ_36ì_1__æ_B6¯4?4-
_æ_ì_x¯__æ_ì_ú__æ_ì_ò__æ_ì___ __æ_7_v_?_?_v_?_o__æ_ì___
_?_Œ_?_?_??a?eï?_?___Ã?_??a?E0èLð"_t_þ_J?_&J?_u_,__è)ðè_ðÃÆ_J
éë_E0è&ð"_t_"__5__!_ni___E__!_t8______E__?_n8_____E__!_<
___ ___E_J_S_"?Cà____E__!_@;______E__!_t_;@__
Š_f?_èÓÊ?Ç__Ã_.:\_rî_^[fXÃ_'0<__8<-__ <_èqÿ$´_öä?ð?þ__?
ÆëÞøÄùÃfVg_8U?_?Sgf_?p_f_ðg_>PC_?Ag_~_IR_?7_?_fPè¯Egf;F_fX_?_g_~__?
f^øÃgöF___?_gf_?v_fÁæ  f_Æë?f^ùÃÑ?TCE 061 123ABC V6.90 ABC ò:_ðR=
p\]E_?_é?Z_a2Ä¨_uøìŠà"ã2át?î__ß_aŠØäa2Ã¨_tøäa2Ã¨_uø&?%ufÁè_Pÿ6___?_
ŒÐ_ÀP?ü?4_ýó??ì_?ì_F_?_f3Û?Ü?ë_Rf3À© **COPYRIGHT 1990,97 ABC
Corporation.All RIGHTS RESERVED.**ŒÐfÁà_f_ÃfPj6____À@__ðë_?__Û?_
_ÃH_"Àè__V_?çXaÏ`-3À_Ø_>__tfÆ___û´_?_K´_Í_ŠÜ´_Í_?òFÿ?_ë_?Ñ´_Í__Í_Àu_E
?_è)_þÁ:ÛuäEè-_Eè__þÁ2É:.?_vÐ?_?Ö´_Í_^-_aï´_Í_öÄ)u_ABCJPN ÃY?ÿë
P-3À_ØÆ___ÿEæ_ë_ä_ÀE_t_æ_ë_æ_û,?Í_XÏSYSTEM MEMORY PARITY ERRORI/
CHANNEL ERROR `äaŠØ$ÀtlEÿæ!´_Í_´Í_?Æâ?._ûAs__é%_ð 07/22/97_ü

AUTOMATED EXTRACTION OF BIOS IDENTIFICATION INFORMATION FOR A COMPUTER SYSTEM FROM ANY OF A PLURALITY OF VENDORS

TECHNICAL FIELD

The present invention relates to information gathering applications within computer systems, and more particularly, to a method and apparatus for automatically extracting information specific to a computer system from any of a plurality of vendors.

BACKGROUND OF THE INVENTION

A typical computer system has information regarding specifications or functionalities for that computer system stored within a predetermined location of a non-volatile memory device, such as a ROM memory device. An example of such information is BIOS (Basic Input/Output System) identification information. BIOS identification information for a computer system is used for various purposes, as known to one of ordinary skill in the art.

For example, BIOS identification information for a computer system may include the brand name, the model name, the BIOS date, and the BIOS version of the computer system. Such information may be used for inventory and asset tracking of a plurality of computer systems. In addition, such information may be used for determining whether a computer system is Y2K compliant. Y2K compliance indicates whether the computer system will operate properly with dates after the year 1999, and Y2K compliance of a computer system is currently a significant issue, as known to one of ordinary skill in the art.

In addition, BIOS identification information may be desired for different models of computer systems from any of a plurality of vendors. A typical large organization uses computer systems from multiple vendors. In addition, because the computer industry is advancing rapidly with time, each vendor provides many different models of computer systems. Thus, a large organization typically has numerous different models of computer systems from various computer system vendors.

A computer system from any of the plurality of vendors has raw BIOS data including BIOS identification information regarding that computer system stored at a predetermined location within a non-volatile memory device such as a ROM memory device of the computer system according to industry standards. However, each vendor includes such information within the raw BIOS data in a different format for different computer system models. Furthermore, a vendor may provide an application specific only to that vendor and that computer system model for determining and using such BIOS identification information.

In the prior art, the BIOS identification information of a computer system may be determined by such an application from the particular vendor for that particular computer system model. However, a collection of such applications from the plurality of vendors for determining the BIOS identification information for each of the computer system models may be needed. Acquisition and maintenance of the collection of a specific application for determining the BIOS identification information for each of numerous models of computer systems from the various vendors is likely to be arduous and costly.

Also in the prior art, the BIOS identification information for a computer system from any of the plurality of vendors may be determined by manually reading off such information from the unit or the case of the computer system or by reading the computer screen when the computer system is first booted up. However, such manual determination of the BIOS identification information for each of a large number of computer systems from the plurality of vendors is arduous and prone to human error.

Thus, an application is desired that runs on any computer system from a plurality of vendors for automatically extracting such BIOS identification information for a computer system from any of the plurality of vendors.

SUMMARY OF THE INVENTION

In accordance with a general aspect of the present invention, an application is provided for automatically extracting BIOS (Basic Input/Output System) identification information for a computer system from any of a plurality of vendors.

Typically, a computer system from any of the plurality of vendors has raw BIOS data, containing BIOS identification information, stored at a predetermined location of a static storage device such as a ROM device of the computer system according to industry standards. However, the raw BIOS data within the computer system is formatted differently for each of the plurality of vendors. In addition, the raw BIOS data contains a large number of non-ASCII characters that obscure the useful BIOS identification information within the raw BIOS data. Advantageously, an embodiment of the present invention processes such raw BIOS data to reformat the raw BIOS data to a BIOS variable such that BIOS identification information is more easily accessible from the BIOS variable.

In a general aspect of the present invention, to reformat the raw BIOS data, the raw BIOS data is searched for each of at least one keyword. For each existing keyword that is found within the raw BIOS data, the raw BIOS data is further searched outward from the existing keyword within the raw BIOS data until a non-ASCII character is encountered to generate a respective resultant text string. The respective resultant text string includes the existing keyword and any ASCII characters to the left and right of the existing keyword until a non-ASCII character is encountered within the raw BIOS data. The respective resultant text string for each existing keyword is appended to a BIOS variable. The BIOS variable is then searched for at least one of a BIOS date, a brand name, a model name, and a BIOS version of the computer system.

In reformatting the raw BIOS data, any extra space character may be removed within the BIOS variable when a sequence of more than one space character is found within the BIOS variable such that only one space character remains for each of the sequence of more than one space character. In addition, a separator character may be inserted between each of the respective resultant text string within the BIOS variable.

Once the raw BIOS data has been reformatted to the BIOS variable, the BIOS variable is searched for predetermined text strings for extracting the brand name, the model name, the BIOS date, and the BIOS version of the computer system.

In this manner, a searching and parsing routine of an embodiment of the present invention processes the raw BIOS data within a computer system from any of the plurality of vendors irrespective of the initial format of the raw BIOS data to generate the BIOS variable. In addition, for certain embodiments of the present invention, predetermined text strings, corresponding to the plurality of vendors, are searched for within the BIOS variable such that the brand name, the model name, the BIOS date, and the BIOS version may be determined for a computer system from any of the plurality of vendors.

Alternatively, the BIOS variable may be processed using a check sum technique with a look-up table for determining the brand name and the model name of the computer system from any of the plurality of vendors.

These and other features and advantages of the present invention will be better understood by considering the following detailed description of the invention which is presented with the attached drawings.

BRIEF DESCRIPTION OF THE DRAWINGS

FIG. 2 is an example raw BIOS data stored within a predetermined location of a static storage device of a computer system;

FIG. 4, including

The figures referred to herein are drawn for clarity of illustration and are not necessarily drawn to scale. Elements having the same reference number in FIGS. 1, 2, 3, 4A, 4B, and 5 refer to elements having similar structure and/or function.

DETAILED DESCRIPTION

Figure 1:
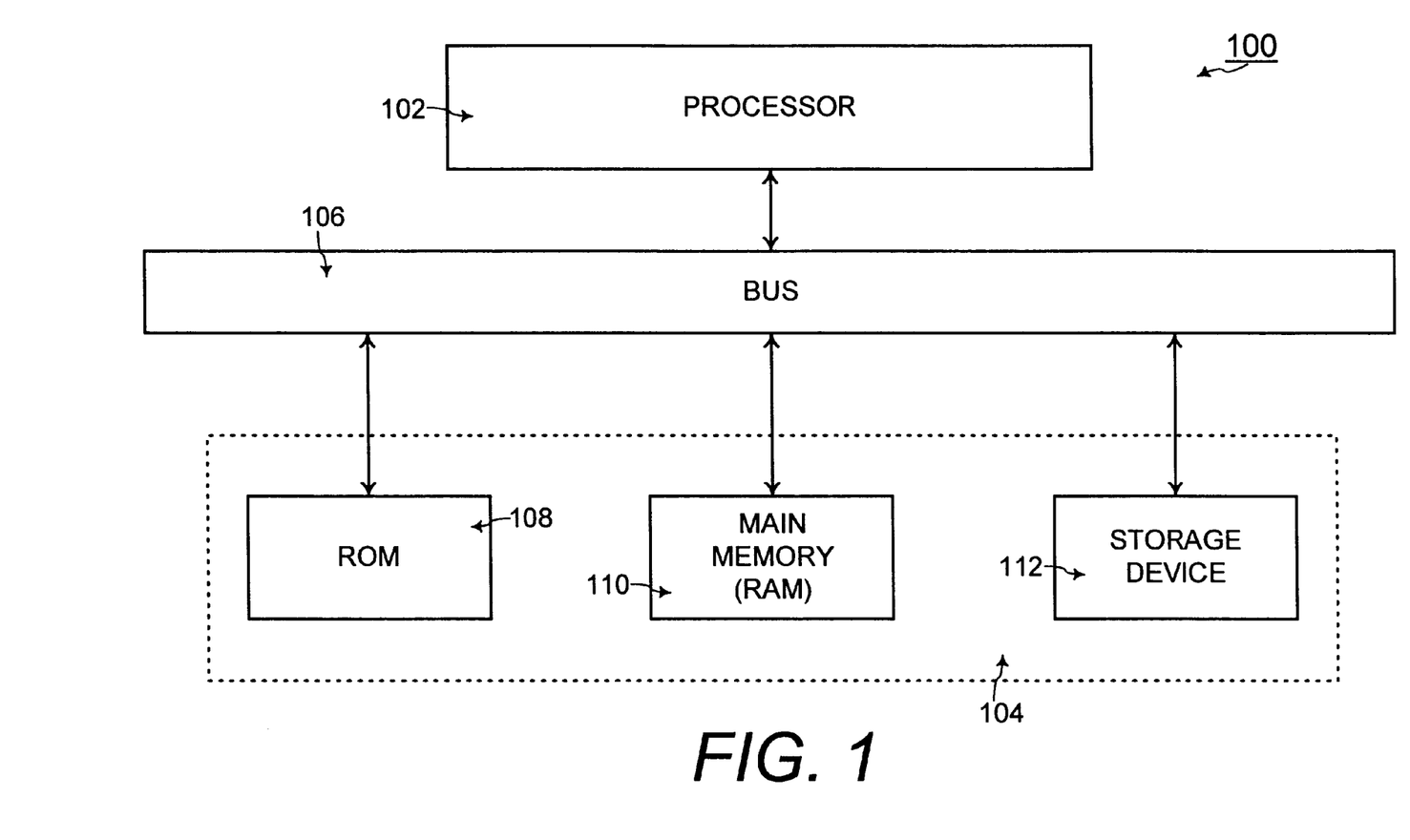
FIG. 1 is a block diagram example computer system that may be used to implement an embodiment of the present invention.

Referring to FIG. 1, a block diagram of an example computer system 100 includes a processor 102 and a memory device 104 (shown within the dashed lines of FIG. 1) of the computer system 100. The processor 102 and the memory device 104 are coupled via a computer system bus 106. The memory device 104 of the computer system 100 includes a static storage device 108 such a ROM (Read Only Memory) device which is an example non-volatile memory device, a main memory 110 such as a RAM (Random Access Memory) device, and any other type of storage device 112 such as a floppy disk or a compact disc.

The static storage device 108, the main memory 110, and the storage device 112 are coupled to the processor 102 via the bus 106. However, FIG. 1 is by way of example only, and the components of FIG. 1 may be coupled by any of a variety of computer system bus structures. The main memory 110 may store data and instructions to be executed by the processor 102, and may also be used for storing temporary variables or files or other types of intermediate data during execution of instructions by the processor 102. The static storage device 108 and the other type of storage device 112 may also store data and instructions to be executed by the processor 102.

In a general aspect of the present invention, the computer system 100 is used for automatically determining the BIOS (Basic Input/Output System) identification information of the computer system 100 irrespective of the model or vendor of the computer system 100. The processor 102 of the computer system 100 executes sequences of instructions contained in the main memory 110. Such instructions may be programmed into the main memory 110 or may be written into the main memory 110 from another computer-readable medium such as the storage device 112. Execution of such sequences of instructions causes the processor 102 to perform the steps of an embodiment of the present invention as described herein.

A computer system from any of a plurality of vendors typically has raw BIOS data, containing BIOS identification information, stored within the static storage device 108 such as a ROM device of the computer system 100, according to industry standards. However, the raw BIOS data within the computer system is formatted differently for each of the plurality of vendors. In addition, the raw BIOS data contains a large number of non-ASCII characters that obscure the BIOS identification information within the raw BIOS data.

Referring to FIG. 2, an example of such raw BIOS data 200 for a computer system (from a fictitious computer system vendor named "ABC Corporation" for an example illustration) includes many such non-ASCII characters. (Note that the example raw BIOS data 200 in FIG. 2 is by way of example only and has been edited with numerous non-ASCII characters already removed for clarity of illustration. In addition, any occurrence of keywords, as will be described herein, are shown in bold text within the example raw BIOS data 200 of FIG. 2 for clarity of illustration.)

Such raw BIOS data 200 is typically formatted differently for the plurality of vendors. Such raw BIOS data 200 is processed in an general aspect of the present invention using a searching and parsing routine to reformat the raw BIOS data to a BIOS variable such that BIOS identification information is more easily accessible from the BIOS variable. The BIOS variable is then more readily searched for determining at least one of the brand name, the model name, the BIOS version, and the BIOS date of the computer system.

Figure 3:
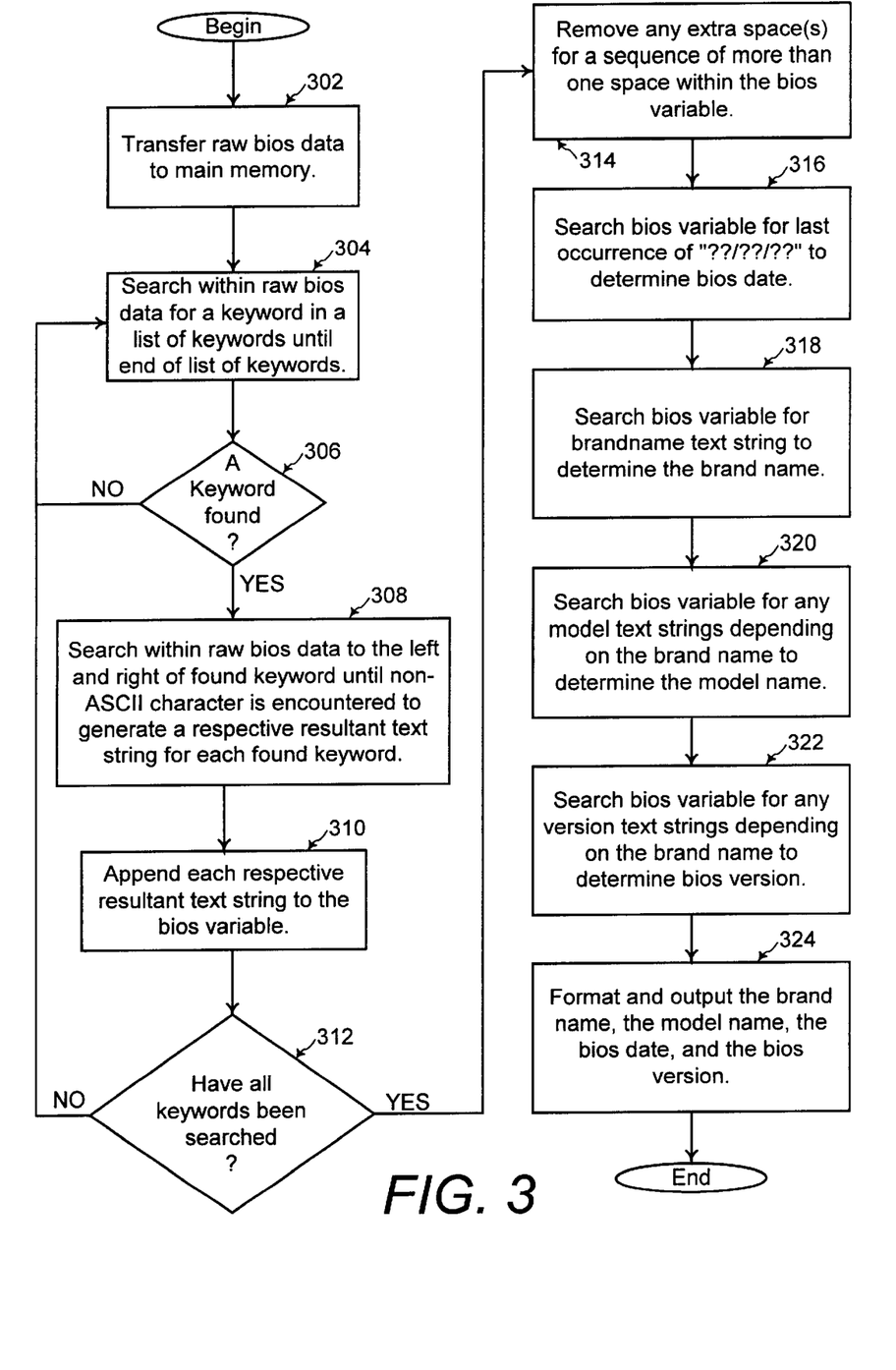
FIG. 3 is a flowchart of steps of an embodiment of the present invention for automatically extracting BIOS identification information of a computer system from any of a plurality of vendors.

FIG. 3 shows a flowchart including the general steps of an embodiment of the present invention for automatically extracting such BIOS identification information for the computer system 100 from any of a plurality of vendors. The raw BIOS data within the predetermined location of the static storage device 108 is transferred to the main memory 110 (step 302 of FIG. 3). Such transfer of the raw BIOS data may be performed by calling an operating system routine of the computer system 100 for transferring such data from the static storage device 108 to a temporary file within the main memory 110.

Then, the raw BIOS data from the temporary file is written to an allocated memory space or a string array variable within the main memory 110. In an alternative embodiment of the present invention, depending on the particularities of the operating system of the computer system 100, the raw BIOS data from the static storage device 108 may be written directly to an allocated memory space or a string array variable within the main memory 110 without use of the temporary file.

Once the raw BIOS data is within the main memory 110, the raw BIOS data is searched for each of a list of keywords (steps 304 and 306 of FIG. 3). These keywords are predetermined text commonly used by vendors of computer systems for BIOS identification information within the raw BIOS data. An example fictitious list of such keywords for example illustration is as follows:

300et
    BIOS
    abc corporation
    acme computer corporation
    optitron
    workstation
    deff_system_
    rem_
    tiger_
    rabbit_
    bear_
    bp&p_
    ??/??/??

with the "?" character representing any single ASCII character and the "_" character representing one ASCII space character.

For each keyword in the list of keywords, if a keyword is not found (step 306 of FIG. 3), the next keyword in the list of keywords is searched for in the raw BIOS data. If an existing keyword is found within the raw BIOS data (step 306 of FIG. 3), then the raw BIOS data is searched to the left and to the right of that existing keyword until a non-ASCII character is encountered to generate a respective resultant text string for that existing keyword (step 308 of FIG. 3). The respective resultant text string for an existing keyword includes that existing keyword and any ASCII characters immediately preceding or immediately succeeding that existing keyword until a non-ASCII character is encountered.

The respective resultant text string for each existing keyword is appended to a BIOS variable (step 310 of FIG. 3). In one embodiment of the present invention, a separator ASCII character such as "|" is inserted between the respective resultant text strings within the BIOS variable.

Once the respective resultant text string for an existing keyword within the list of keywords has been determined, the next keyword within the list of keywords is searched for in the raw BIOS data (step 312 of FIG. 3). In this manner, each keyword within the list of keywords is searched for in the raw BIOS data (step 312 of FIG. 3). The BIOS variable is then generated when a respective resultant text string of each existing keyword of the list of keywords is appended to the BIOS variable.

After generation of the respective BIOS variable corresponding to the raw BIOS data of the computer system 100, the BIOS variable is searched to find any occurrence of a sequence of more than one ASCII space character. Any extra space character within a sequence of more than one ASCII space character is removed from the BIOS variable such that only one ASCII space character remains for each of such a sequence of more than one ASCII space character within the BIOS variable (step 314 of FIG. 3).

For the example raw BIOS data 200 of FIG. 2, the resulting BIOS variable after step 314 of FIG. 3 of an embodiment of the present invention is as follows:

|123ABC V6.90 ABC|© COPYRIGHT 1990,97 ABC Corporation.All RIGHTS RESERVED.|ABCJPN|07/22/97|

In this manner, a searching and parsing routine of an embodiment of the present invention processes the raw BIOS data within a computer system from any of a plurality of vendors irrespective of the initial format of the raw BIOS data to generate the BIOS variable. The resulting BIOS variable after such a searching and parsing routine does not contain the numerous non-ASCII characters which obscure the BIOS identification information within the raw BIOS data.

Once the BIOS variable is thus generated for the computer system 100, the BIOS variable is searched for predetermined text strings to determine the BIOS identification information for the computer system 100 such as the brand name, the model name, the BIOS version, and the BIOS date. For example, the BIOS variable is searched for a last occurrence of the text string "??/??/??" to determine the BIOS date (step 316 of FIG. 3), with the "?" character being any single ASCII character.

In addition, the BIOS variable is searched for predetermined brand text strings indicating the brand name of the computer system (step 318 of FIG. 3). Depending on the brand name of the computer system, the BIOS variable is searched for predetermined model text strings indicating the model name of the computer system (step 320 of FIG. 3) and/or for predetermined BIOS version text strings indicating the BIOS version of the computer system (step 322 of FIG. 3).

The following examples illustrate example search routines used for computers systems from several fictitious computer system vendors. Such computer system vendors are given fictitious names for example illustration of search routines.

For ACME Computer Systems:
    (1) Search the BIOS variable for the strings: "acme corporation";
    (2) If above match is found, then set brand name variable=ACME;
    (3) If brand name variable=ACME, then search the BIOS variable for string: "BIOS version"; and
    (4) If above match is found, set BIOS version variable={the numerals to the right of the matched string "BIOS version" in the BIOS variable}.

For BP&P Computer Systems:
    (1) Search the BIOS variable for the string: "bp&p";
    (2) If above match is found, then set brand name variable=BP&P;
    (3) If brand name variable=BP&P, then search the BIOS variable for string: "BIOS version"; and
    (4) If above match is found, set BIOS version variable={the numerals to the right of the matched string "BIOS version" in the BIOS variable}.

For Deff Computer Systems:
    (1) Search the BIOS variable for the string: "deff computer corporation";
    (2) If above match is found, then set brand name variable=Deff;
    (3) If brand name variable=Deff, then search the BIOS variable for string: "BIOS version";
    (4) If above match is found, set BIOS version variable={the numerals to the right of the matched string "BIOS—version" in the BIOS variable};
    (5) If brand name variable=Deff, then search the BIOS variable for string: "|tiger_" or "|rabbit_" or "|bear_"; and
    (6) If the above match is found, then set the model name variable={matched string and all text to the right up to the next separator character in the BIOS variable}.

Note that "_" in any text string represents a single ASCII space character. The above list of search routines for determining the brand name, the model name, and/or the BIOS version are by way of example only for example computer systems from vendors given fictitious names for example illustration. Other routines for searching the BIOS variable may be designed for any type of computer system from commonly known real computer system vendors for the practice of embodiments of the present invention.

When at least one of the brand name, the model name, the BIOS version, and the BIOS date is determined for a computer system, these variable are properly formatted and output as the BIOS identification information for that computer system (step 324 of FIG. 3). The output variables of the brand name, the model name, the BIOS version, and the BIOS date are formatted for example by trimming any excess ASCII space character(s) or the separator character "|" off from such output variables. For the example raw BIOS data 200 for a computer system from "ABC Corporation" of FIG. 2, the resulting BIOS variable after step 314 of FIG. 3 of an example embodiment of the present invention is as follows:

|123ABC V6.90 ABC|© COPYRIGHT 1990,97 ABC Corporation.All RIGHTS RESERVED.|ABCJPN07/22/97|

The performance of steps 316, 318, 320, and 322 of FIG. 3 results in the following output of the BIOS identification information for such a computer system:

Brand Name=ABC
Model Name 123ABC
BIOS Version=6.90
BIOS Date=07/22/1997

In an alternative embodiment of the present invention, the BIOS variable is processed with a check sum technique and a look-up table to determine the brand name and model name of the computer system. Such a mechanism for determining the brand name and the model name of the computer system may be particularly advantageous when the brand name and the model name of the computer system is not readily determinable from searching the BIOS variable for the predetermined text strings indicating the brand name and the model name of the computer system. Alternatively, the check sum technique with the look-up table may be used for determining the brand name and/or the model name of the computer system instead of searching the BIOS variable for predetermined text strings indicating the brand name and/or the model name.

Figure 4A:
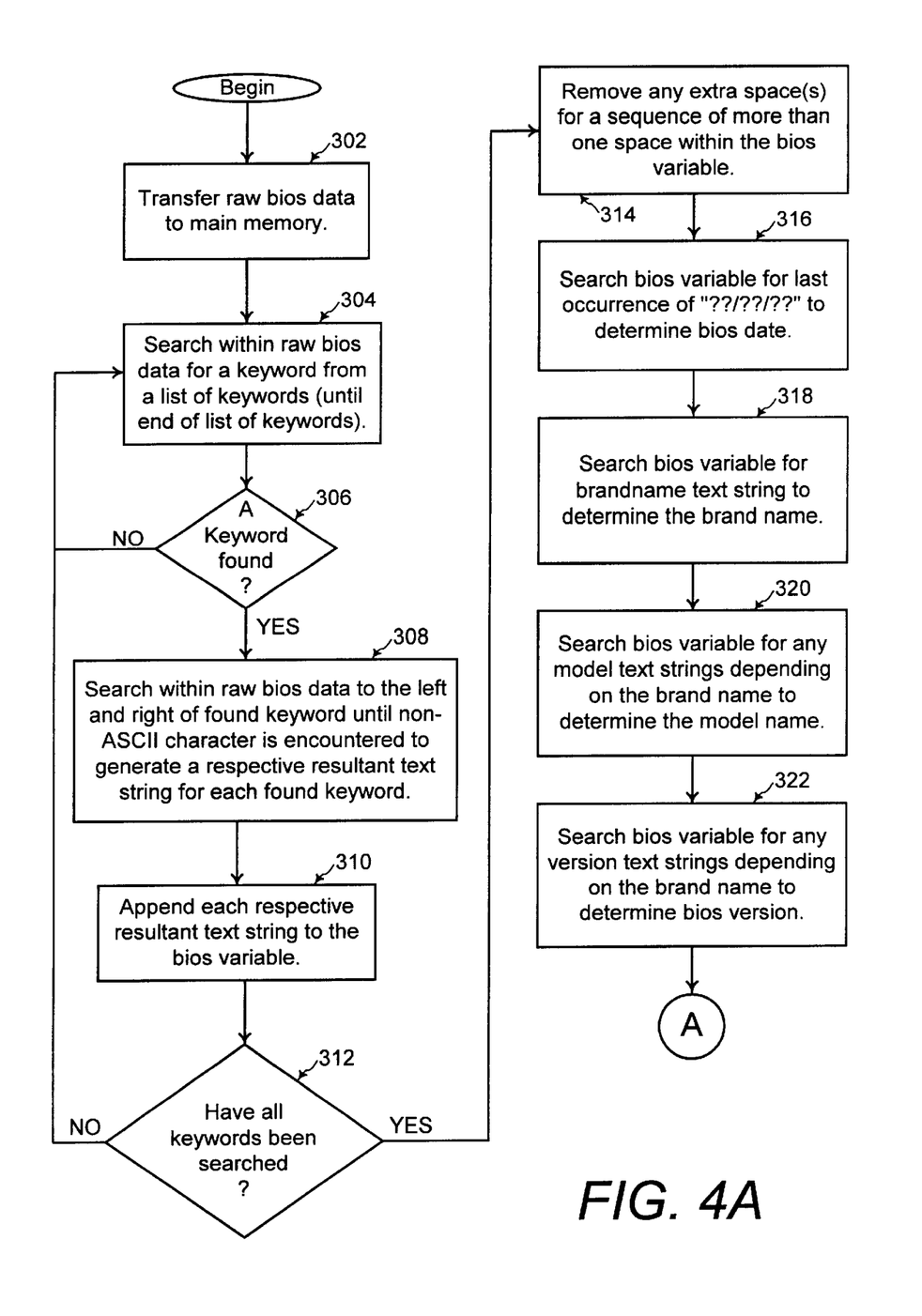
FIGS. 4A and 4B, is a flowchart of steps of an embodiment of the present invention using a check sum technique with a look up table for determining the brand name and the model name of a computer system from any of the plurality of vendors.
Figure 4B:
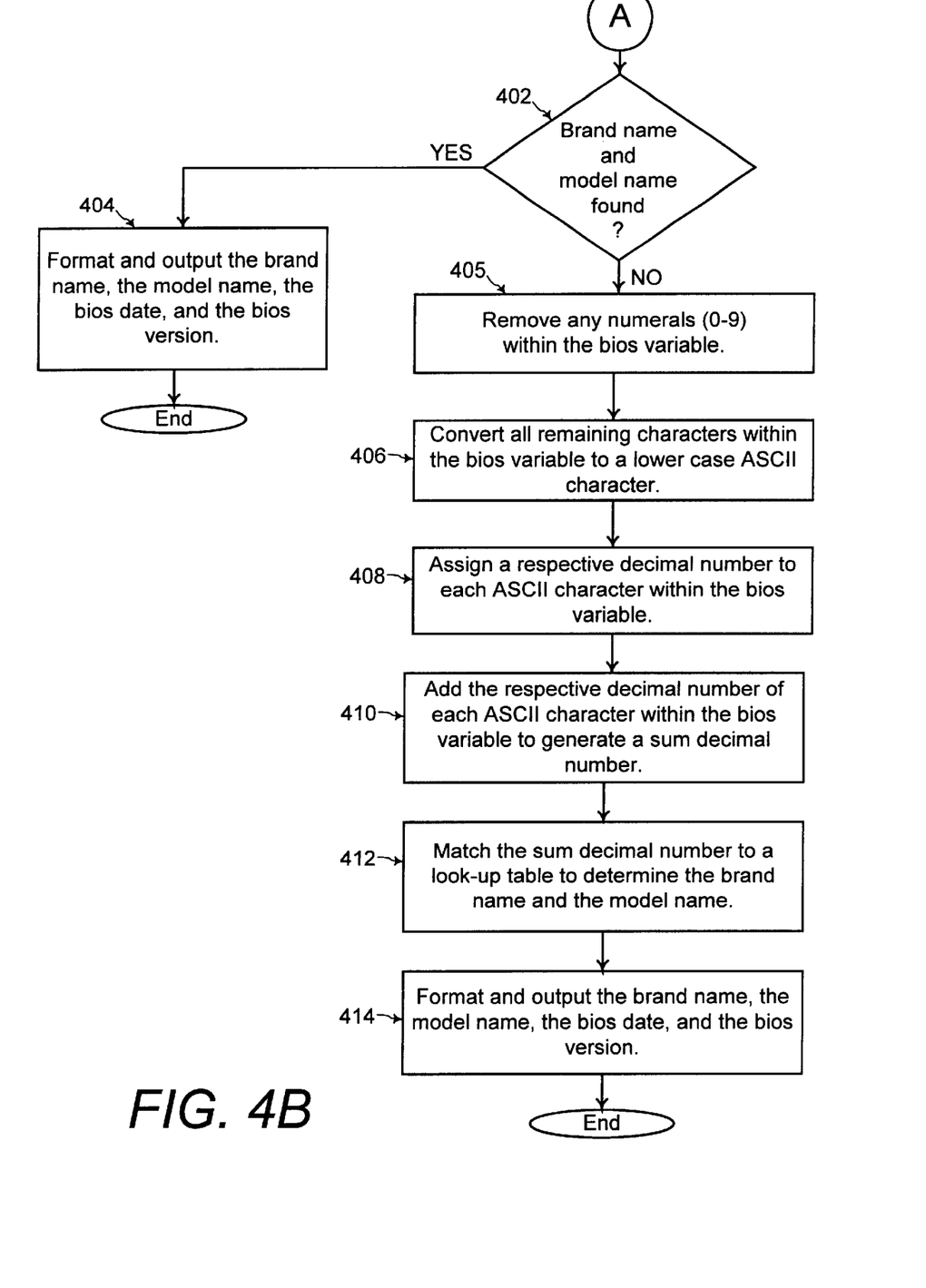

Referring to FIG. 4A, steps 302–322 of the flowchart of FIG. 4A is similar to the identically numbered steps of the flowchart of FIG. 3. Referring to FIGS. 4A and 4B, if after step 322, the brand name or the model name of the computer system is determined (step 402 of FIG. 4B), then the BIOS identification information is properly formatted and output for that computer system (step 404 of FIG. 4B) similar to step 324 of FIG. 3. If after step 322, the brand name or the model name of the computer system is not determined (step 402 of FIG. 4B), an alternative embodiment of the present invention performs the steps of the check sum technique.

The check sum technique includes the step of removing any ASCII number character (0-9) within the BIOS variable (step 404 of FIG. 4B). All remaining characters within the BIOS variable are then converted to a respective lower case ASCII character (step 406 of FIG. 4B). Each ASCII character within the BIOS variable is then assigned a respective decimal number (step 408 of FIG. 4B). For example, "a"= 65, "b"=66, "c"="67", etc. The respective decimal number of each ASCII character within the BIOS variable is then summed to generate a sum decimal number (step 410 of FIG. 4B).

The sum decimal number is then matched to an entry within a look-up table to determine the brand name and/or the model name of the computer system (step 412 of FIG. 4B). Such a look-up table has a list of known predetermined sum decimal numbers with each such known predetermined sum decimal number corresponding to a respective brand name and/or model name. When the sum decimal number generated in step 410 of FIG. 4B of an embodiment of the present invention matches an entry within the look-up table within a predetermined variance (for example within 2.5%), then the respective brand name and/or model name corresponding to that entry is the brand name and/or model name of that computer system. Upon such a determination, the BIOS identification information is properly formatted and output for that computer system (step 414 of FIG. 4B) similar to step 324 of FIG. 3.

In this manner, the BIOS identification information including at least one of the brand name, the model name, the BIOS version, and the BIOS date of a computer system from any of a plurality of vendors is automatically determined by general principles of the present invention. A computer system from any of a plurality of vendors has raw BIOS data including BIOS identification information regarding that computer system stored at a predetermined location within a static storage device such as a ROM memory device of the computer system according to industry standards. However, each vendor includes such information within the raw BIOS data in a different format, and the raw BIOS data includes many non-ASCII characters which may obscure the BIOS identification information. A particular aspect of the present invention processes such raw BIOS data using a searching and parsing routine to generate a BIOS variable that is more easily searchable for determining the BIOS identification information. Another aspect of the present invention then includes routines for searching the BIOS variable to determine the BIOS identification information for any computer system from a plurality of vendors from the BIOS variable.

Such BIOS identification information may be used to particular advantage for determining whether a computer system is Y2K compliant. Y2K compliance of a computer system is currently a significant issue as known to one of ordinary skill in the art of computer systems. For example, the BIOS date and/or the BIOS version of a computer system may readily indicate whether that computer system is Y2K compliant.

Figure 5:
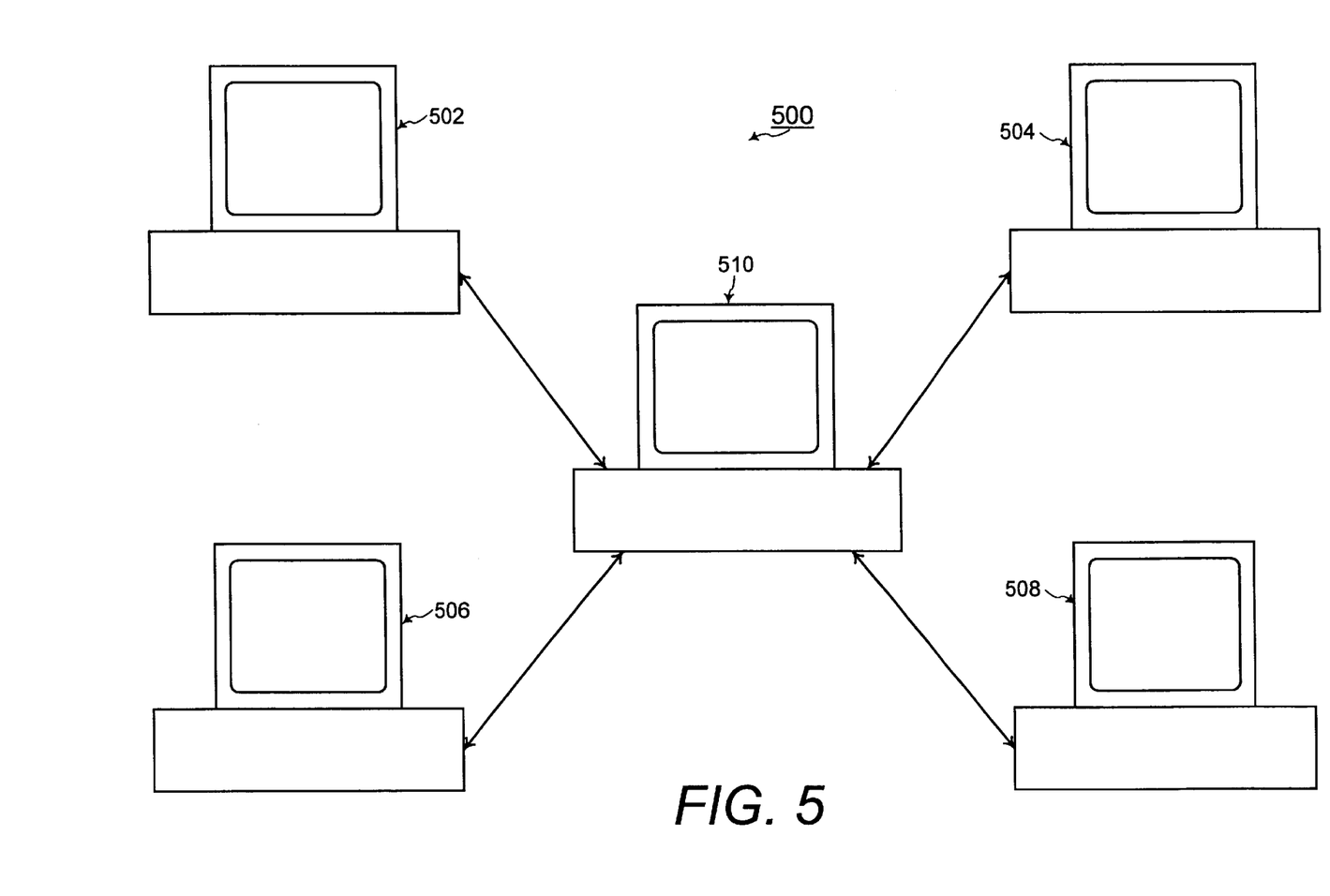
FIG. 5 shows a network of computer systems whereby the BIOS identification information of a computer system within the network is sent from that computer system to a central managing system within the network for electronic inventory and/or asset tracking.

In addition, the BIOS identification information determined by an embodiment of the present invention may be used to particular advantage for electronic inventory and asset tracking of a plurality of computer systems. Referring to FIG. 5, for example, a network of computer systems 500 includes a first computer system 502, a second computer system 504, a third computer system 506, and a fourth computer system 508. Each of such computer systems 502, 504, 506, and 508 may be from a different one of a plurality of computer system vendors.

Each of the computer systems 502, 504, 506, and 508 includes the mechanism for performing the steps of example embodiments of present invention such that the BIOS identification information including at least one of the brand name, the model name, the BIOS version, and the BIOS date is automatically determined at the computer system. Each of the computer systems 502, 504, 506, and 508 sends the respective BIOS identification information for that computer system to a central managing system 510 which then maintains electronic inventory or asset tracking of each of the computer systems 502, 504, 506, and 508.

The foregoing is by way of example only and is not intended to be limiting. For instance, the raw BIOS data 200 shown in FIG. 2 is only an example raw BIOS data for a particular computer system. The routines for searching the BIOS variable described herein are by way of example only, and other embodiments of the present invention may include other search routines for any types of computer systems from any vendor, as would be apparent to one of ordinary skill the art from the description herein. Aspects of the present invention may be used to determine at least one of the brand name, the model name, the BIOS version, and the BIOS date for the BIOS identification information of a computer system.

The computer system 100 of FIG. 1 for executing the steps of embodiments of the present invention is by way of example only. In another embodiment of the present invention, hard-wired circuitry may be used in place of or in combination with such executable sequences of instructions for implementing aspects of the present invention. Thus, the present invention is not limited to any specific combination of hardware circuitry and software.

The present invention is limited only as defined in the following claims and equivalents thereof.

We claim:

1. A method for automatically extracting BIOS (Basic Input/Output System) identification information for a computer system from any of a plurality of vendors, the method including the steps of:
    A. searching raw BIOS data, from a predetermined location of a memory device within said computer system, for each of at least one keyword;
    B. for each existing keyword of said at least one keyword that is found within said raw BIOS data, searching outward from left and right of said existing keyword until a non-ASCII character is encountered within said raw BIOS data;
    C. generating a respective resultant text string which includes said existing keyword and any ASCII characters to the left and right of said existing keyword until a non-ASCII character is encountered within said raw BIOS data;
    D. appending said respective resultant text string for said each existing keyword to a BIOS variable; and
    E. searching said BIOS variable for at least one of a BIOS date, a brand name, a BIOS version, and a model name of said computer system.

2. The method of claim 1, further including the step of:
    transferring said raw BIOS data from said predetermined location of a static storage device into main memory of said computer system, before said step A.

3. The method of claim 2, further including the steps of:
    transferring said raw BIOS data from said predetermined location of said static storage device to a temporary file; and
    storing said raw BIOS data within said temporary file into said main memory of said computer system.

4. The method of claim 1, further including the step of:
    removing any extra space character within said BIOS variable when a sequence of more than one space character is found within said BIOS variable such that only one space character remains for each of said sequence of more than one space character, before said step E.

5. The method of claim 1, further including the step of:
    inserting a separator character between each of said respective resultant text string within said BIOS variable.

6. The method of claim 1, wherein said step E further includes the step of:
    searching said BIOS variable for a last occurrence of a text string ??/??/?? for extracting said BIOS date of said computer system, wherein "?" is any ASCII character.

7. The method of claim 1, wherein said step E further includes the steps of:
    searching said BIOS variable for a respective predetermined brand text string for each of said plurality of vendors to determine said brand name of said computer system; and
    searching said BIOS variable for at least one predetermined model text string depending on said brand name of said computer system to determine said model name of said computer system.

8. The method of claim 1, wherein said step E further includes the steps of:
    searching said BIOS variable for a respective predetermined brand text string for each of said plurality of vendors to determine said brand name of said computer system; and
    searching said BIOS variable for at least one predetermined BIOS version text string depending on said brand name of said computer system to determine said BIOS version of said computer system.

9. The method of claim 1, further including the steps of:
    removing any ASCII number character within said BIOS variable;
    converting all remaining characters within said BIOS variable to a respective lower case ASCII character;
    assigning a respective decimal number to each ASCII character within said BIOS variable;
    adding said respective decimal number of each ASCII character within said BIOS variable to generate a sum decimal number; and
    matching said sum decimal number to an entry within a look-up table to determine at least one of said brand name and said model name of said computer system.

10. The method of claim 9, wherein said steps of the method of claim 9 are performed when at least one of said brand name of said computer system and said model name of said computer system cannot be determined by searching said BIOS variable for said respective predetermined brand text string for each of said plurality of vendors and for said at least one predetermined model text string.

11. The method of claim 1, further including the step of:
    determining whether said computer system is Y2K compliant from at least one of said BIOS date and said BIOS version of said computer system.

12. The method of claim 1, further including the step of:
    sending said at least one of said BIOS date, said brand name, said BIOS version, and said model name of said computer system to a central managing system for electronic inventory tracking of said computer system.

13. A method for automatically extracting BIOS (Basic Input/Output System) identification information for a computer system from any of a plurality of vendors, the method including the steps of:
    A. transferring raw BIOS data from a predetermined location of a static storage device within said computer system to a temporary file;
    B. storing said raw BIOS data within said temporary file into main memory of said computer system;
    C. searching said raw BIOS data within said main memory for each of at least one keyword;

D. for each existing keyword of said at least one keyword that is found within said raw BIOS data, searching outward from left and right of said existing keyword within said raw BIOS data until a non-ASCII character is encountered within said raw BIOS data;

E. generating a respective resultant text string which includes said existing keyword and any ASCII characters to the left and right of said existing keyword until a non-ASCII character is encountered within said raw BIOS data;

F. appending said respective resultant text string for said each existing keyword to a BIOS variable;

G. inserting a separator character between each of said respective resultant text string within said BIOS variable;

H. removing any extra space character within said BIOS variable when a sequence of more than one space character is found within said BIOS variable such that only one space character remains for each of said sequence of more than one space character;

I. searching said BIOS variable for at least one of a BIOS date, a brand name, a BIOS version, and a model name of said computer system, said step I further including the steps of:
   searching said BIOS variable for a last occurrence of a text string ??/??/?? for extracting said BIOS date of said computer system, wherein "?" is any ASCII number character;
   searching said BIOS variable for a respective predetermined brand text string for each of said plurality of vendors to determine said brand name of said computer system;
   searching said BIOS variable for at least one predetermined model text string depending on said brand name of said computer system to determine said model name of said computer system; and
   searching said BIOS variable for at least one predetermined BIOS version text string depending on said brand name of said computer system to determine said BIOS version of said computer system;

J. determining whether said computer system is Y2K compliant from at least one of said BIOS date and said BIOS version of said computer system; and K. sending said at least one of said BIOS date, said brand name, said BIOS version, and said model name of said computer system to a central managing system for electronic inventory tracking of said computer system.

14. A method for automatically extracting BIOS (Basic Input/Output System) identification information for a computer system from any of a plurality of vendors, the method including the steps of:

A. searching raw BIOS data, from a predetermined location of a memory device within said computer system, for each of at least one keyword;

B. for each existing keyword of said at least one keyword that is found within said raw BIOS data, searching for any ASCII character immediately preceding or immediately succeeding said existing keyword until a non-ASCII character is encountered within said raw BIOS data;

C. generating a respective resultant text string which includes said existing keyword and any ASCII character immediately preceding or immediately succeeding said existing keyword until a non-ASCII character is encountered within said raw BIOS data;

D. appending said respective resultant text string for said each existing keyword to a BIOS variable; and E. searching said BIOS variable for at least one of a BIOS date, a brand name, a BIOS version, and a model name of said computer system.

15. A computer system comprising:

a processor; and a memory device having raw BIOS (Basic Input/Output System) data stored at a predetermined location of said memory device;

and wherein said memory device has sequences of instructions stored thereon, and wherein execution of said sequences of instructions by said processor causes said processor to automatically extract BIOS (Basic Input/Output System) identification information for said computer system from any of a plurality of vendors by performing the steps of:
   searching said raw BIOS data, from said predetermined location of said memory device, for each of at least one keyword;
   for each existing keyword of said at least one keyword that is found within said raw BIOS data, searching outward from left and right of said existing keyword within said raw BIOS data until a non-ASCII character is encountered within said raw BIOS data;
   generating a respective resultant text string which includes said existing keyword and any ASCII characters to the left and right of said existing keyword until a non-ASCII character is encountered within said raw BIOS data;
   appending said respective resultant text string for said each existing keyword to a BIOS variable; and
   searching said BIOS variable for at least one of a BIOS date, a brand name, a BIOS version, and a model name of said computer system.

16. The computer system of claim 15, wherein said processor further performs the step of:
   transferring said raw BIOS data from said predetermined location of a static storage device into main memory of said computer system, before said step of searching said raw BIOS data for each of said at least one keyword.

17. The computer system of claim 15, wherein said processor further performs the steps of:
   removing any extra space character within said BIOS variable when a sequence of more than one space character is found within said BIOS variable such that only one space character remains for each of said sequence of more than one space character, before said step of searching said BIOS variable; and
   inserting a separator character between each of said respective resultant text string within said BIOS variable in said step of appending said respective resultant text string to said BIOS variable.

18. The computer system of claim 15, wherein said processor further performs the steps of:
   searching said BIOS variable for a last occurrence of a text string ??/??/?? for extracting said BIOS date of said computer system, wherein "?" is any ASCII character;
   searching said BIOS variable for a respective predetermined brand text string for each of said plurality of vendors to determine said brand name of said computer system;
   searching said BIOS variable for at least one predetermined model text string depending on said brand name of said computer system to determine said model name of said computer system; and searching said BIOS variable for at least one predetermined BIOS version text string depending on said brand name of said computer system to determine said BIOS version of said computer system.

19. The computer system of claim 18, wherein at least one of said brand name of said computer system and said model name of said computer system cannot be determined by searching said BIOS variable for said respective predetermined brand text string for each of said plurality of vendors and for said at least one predetermined model text string, and wherein said processor further performs the steps of:

removing any ASCII number character within said BIOS variable;

converting all remaining characters within said BIOS variable to a respective lower case ASCII character;

assigning a respective decimal number to each ASCII character within said BIOS variable;

adding said respective decimal number of each ASCII character within said BIOS variable to generate a sum decimal number; and matching said sum decimal number to an entry within a look-up table to determine at least one of said brand name and said model name of said computer system.

20. The computer system of claim 15, wherein said processor further performs the step of:

determining whether said computer system is Y2K compliant from at least one of said BIOS date and said BIOS version of said computer system.

21. A computer readable medium having stored thereon sequences of instructions for automatically extracting BIOS (Basic Input/Output System) identification information for a computer system from any of a plurality of vendors, wherein the sequences of instructions are for performing the steps of:

searching raw BIOS data, from a predetermined location of a memory device within said computer system, for each of at least one keyword;

for each existing keyword of said at least one keyword that is found within said raw BIOS data, searching outward from left and right of said existing keyword within said raw BIOS data until a non-ASCII character is encountered within said raw BIOS data;

generating a respective resultant text string which includes said existing keyword and any ASCII characters to the left and right of said existing keyword until a non-ASCII character is encountered within said raw BIOS data;

appending said respective resultant text string for said each existing keyword to a BIOS variable; and searching said BIOS variable for at least one of a BIOS date, a brand name, a BIOS version, and a model name of said computer system.

22. The computer readable medium of claim 21, further comprising sequences of instructions for performing the step of:

transferring said raw BIOS data from said predetermined location of a static storage device into main memory of said computer system, before said step of searching said raw BIOS data for each of said at least one keyword.

23. The computer readable medium of claim 21, further comprising sequences of instructions for performing the steps of:

removing any extra space character within said BIOS variable when a sequence of more than one space character is found within said BIOS variable such that only one space character remains for each of said sequence of more than one space character, before said step of searching said BIOS variable; and inserting a separator character between each of said respective resultant text string within said BIOS variable in said step of appending said respective resultant text string for said each existing keyword to said BIOS variable.

24. The computer readable medium of claim 21, further comprising sequences of instructions for performing the steps of:

searching said BIOS variable for a last occurrence of a text string ??/??/?? for extracting said BIOS date of said computer system, wherein "?" is any ASCII character;

searching said BIOS variable for a respective predetermined brand text string for each of said plurality of vendors to determine said brand name of said computer system;

searching said BIOS variable for at least one predetermined model text string depending on said brand name of said computer system to determine said model name of said computer system; and searching said BIOS variable for at least one predetermined BIOS version text string depending on said brand name of said computer system to determine said BIOS version of said computer system.

25. The computer readable medium of claim 21, wherein at least one of said brand name of said computer system and said model name of said computer system cannot be determined by searching said BIOS variable for said respective predetermined brand text string for each of said plurality of vendors and for said at least one predetermined model text string, and wherein said computer readable medium further comprises sequences of instructions for performing the steps of:

removing any ASCII number character within said BIOS variable;

converting all remaining characters within said BIOS variable to a respective lower case ASCII character;

assigning a respective decimal number to each ASCII character within said BIOS variable;

adding said respective decimal number of each ASCII character within said BIOS variable to generate a sum decimal number; and matching said sum decimal number to an entry within a look-up table to determine at least one of said brand name and said model name of said computer system.

26. The computer readable medium of claim 21, further comprising sequences of instructions for performing the step of:

determining whether said computer system is Y2K compliant from at least one of said BIOS date and said BIOS version of said computer system.

\* \* \* \* \*